Dec. 13, 1927. 1,652,325
C. PLETSCHER
BAKING OUTFIT
Filed Nov. 3, 1925 4 Sheets-Sheet 1

INVENTOR
Carl Pletscher
BY
Newell A Spencer
ATTORNEYS

Dec. 13, 1927.
C. PLETSCHER
1,652,325
BAKING OUTFIT
Filed Nov. 3, 1925    4 Sheets-Sheet 2
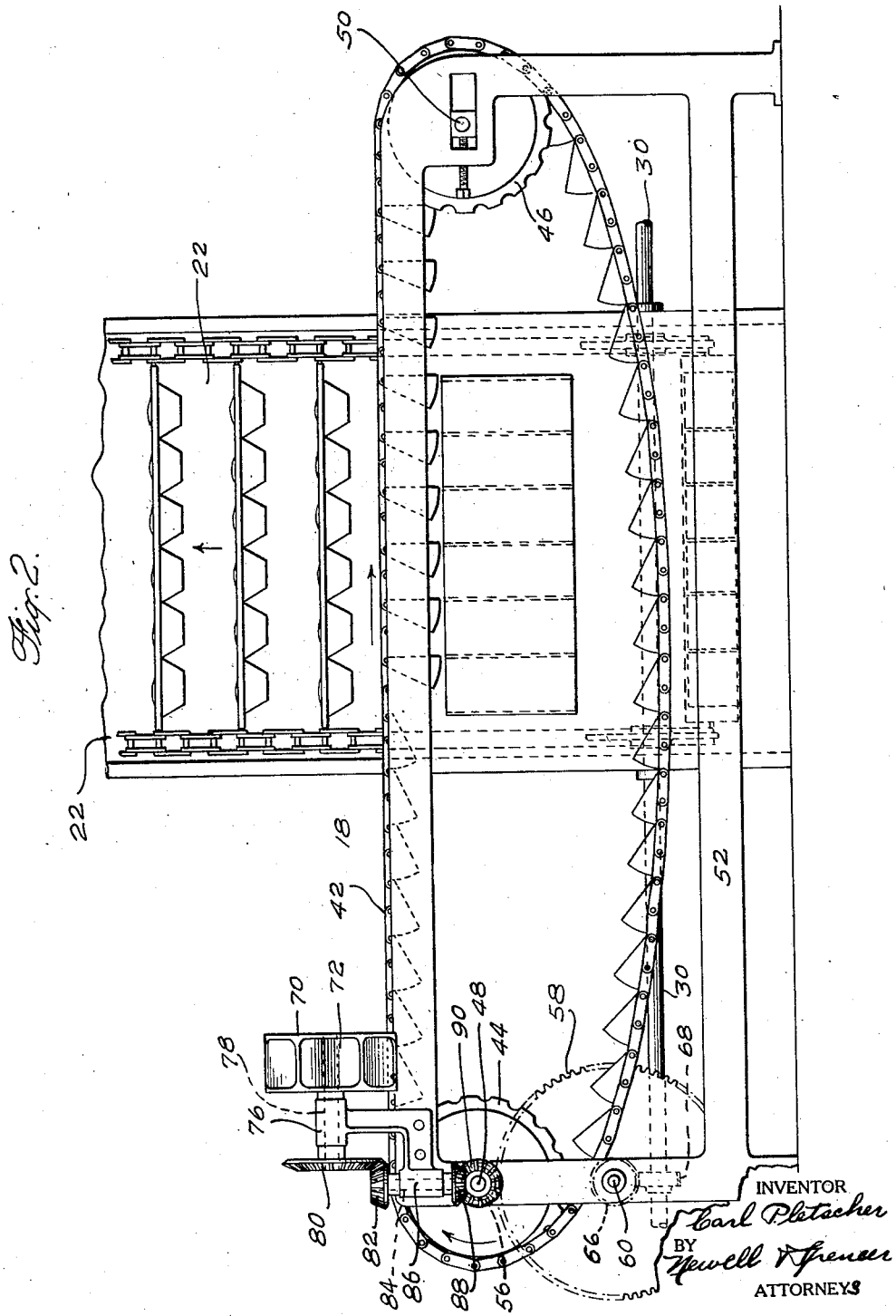

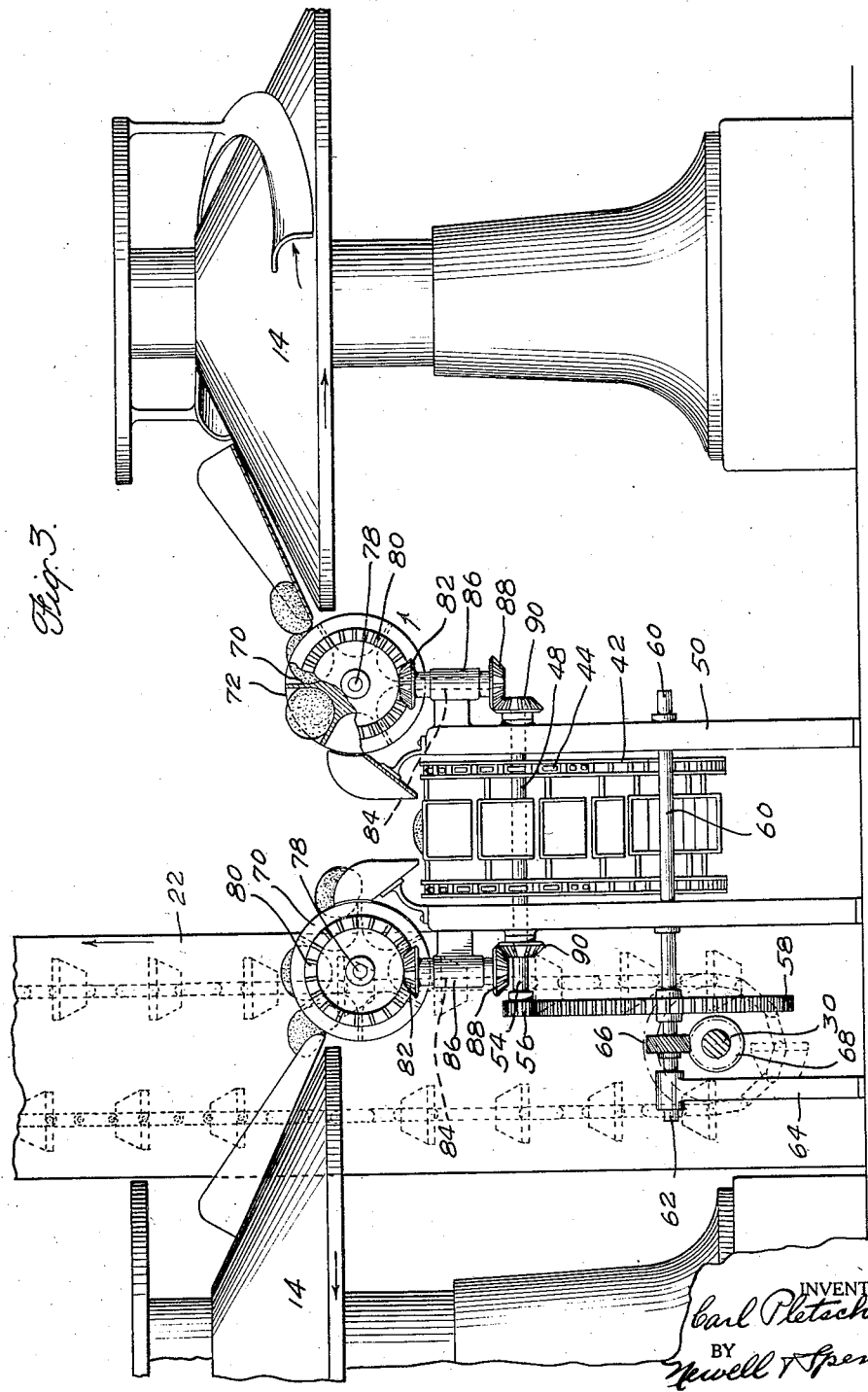

Dec. 13, 1927.
C. PLETSCHER
BAKING OUTFIT
Filed Nov. 3, 1925
1,652,325
4 Sheets-Sheet 4
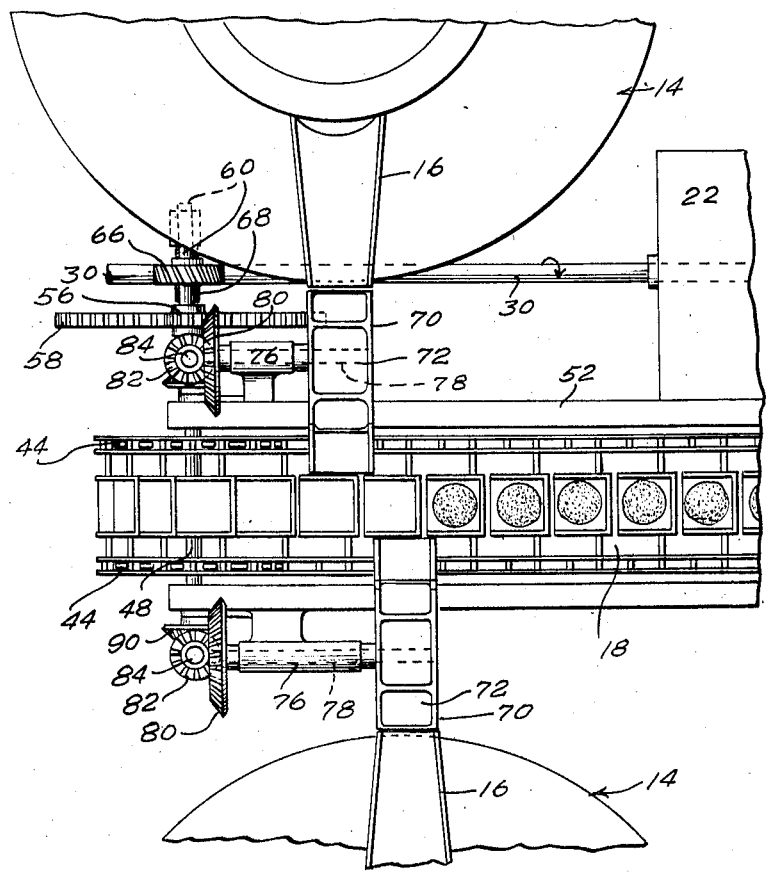
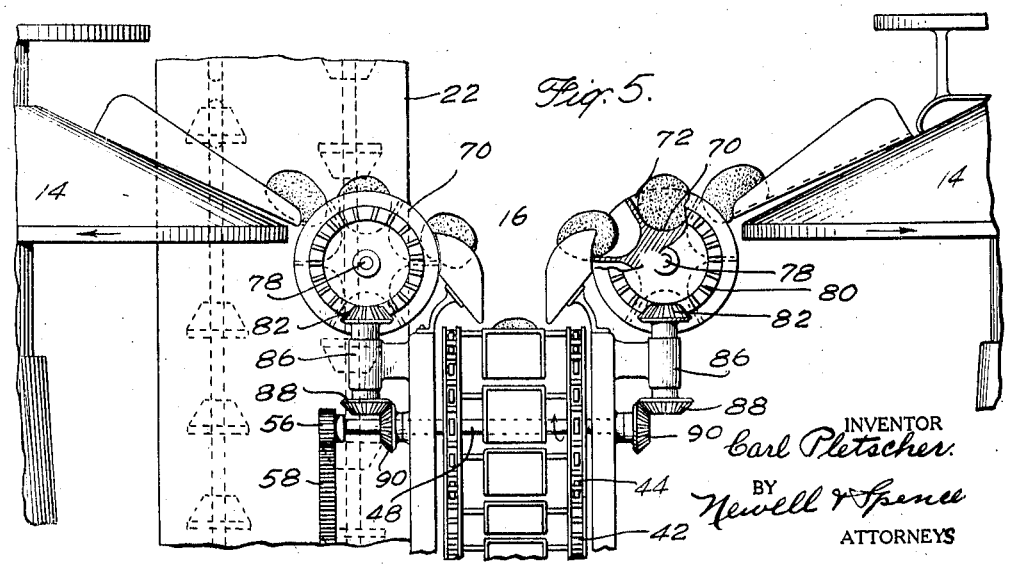

Patented Dec. 13, 1927.

1,652,325

UNITED STATES PATENT OFFICE.

CARL PLETSCHER, OF SAGINAW, MICHIGAN, ASSIGNOR, BY MESNE ASSIGNMENTS, TO BAKER PERKINS COMPANY, INC., OF SAGINAW, MICHIGAN, A CORPORATION OF NEW YORK.

BAKING OUTFIT.

Application filed November 3, 1925. Serial No. 66,443.

The present invention relates to baking machinery and more particularly to a novel arrangement and combination of mechanisms for operating upon pieces of dough.

In large baking plants where bread is baked in large quantities the dough is fed to a machine known as a divider or scaler which divides the dough into pieces of a predetermined size, dependent upon the weight of loaf desired. From the divider or scaler the dough in the form of individual pieces is delivered to a rounding machine which gives to each piece the general shape desired in the finished product. From the rounding machine, the dough pieces are delivered by a suitable timing mechanism to means for feeding or delivering the dough pieces to a proofer, oven or the like, and it is a common practice to drive these several units in synchronism and thereby obtain automatic operation of the plant as a whole.

In the development of modern baking machinery, however, the "travelling oven" has reached a stage where its capacity is not satisfied by the known types of dividers, rounders, etc., and the output capacity of a baking plant which before the development of the travelling oven was dependent upon the oven capacity, has now become limited to the capacity of those machines employed to prepare and feed the dough pieces to the oven, which capacity is, under present conditions, not equal to the oven capacity.

One object of the present invention is to produce a novel combination and arrangement of the several mechanisms of a baking outfit employed in preparing and feeding pieces of dough by which the output of the outfit may be considerably increased.

Another object of the invention is to produce an improved combination and arrangement of several units of an automatic baking outfit whereby an oven of the largest capacity will be adequately supplied to its full capacity by the machines employed to prepare and feed the pieces of dough thereto.

A still further object of the invention is to so arrange several units employed in the baking outfit in preparing the dough, that should one of said units from any cause become inoperative, the entire outfit will not be rendered inoperative, but may continue in operation with the reduced outfit.

With this and other objects in view, the invention consists of the novel and improved features and constructions of combinations and parts hereinafter described and more specifically pointed out in the claims, the advantages of which will be readily understood by those skilled in the art.

The invention will be clearly understood from the accompanying drawings illustrating the invention in its preferred form and the following detailed description of the constructions therein shown.

Referring to the accompanying drawings, Fig. 1 is a plan view of a baking apparatus setting forth one arrangement of units by means of which the object of the present invention may be accomplished.

Fig. 2 is a view in front elevation, illustrating particularly the conveyor and proofer mechanisms.

Fig. 3 is a view in end elevation showing the arrangement of the rounders, conveyor, proofer and certain associated parts.

Fig. 4 is a detail plan view of a modified form of the invention, and

Fig. 5 is a view in detail end elevation of that form of the invention set forth in Fig. 4.

Figure 1:
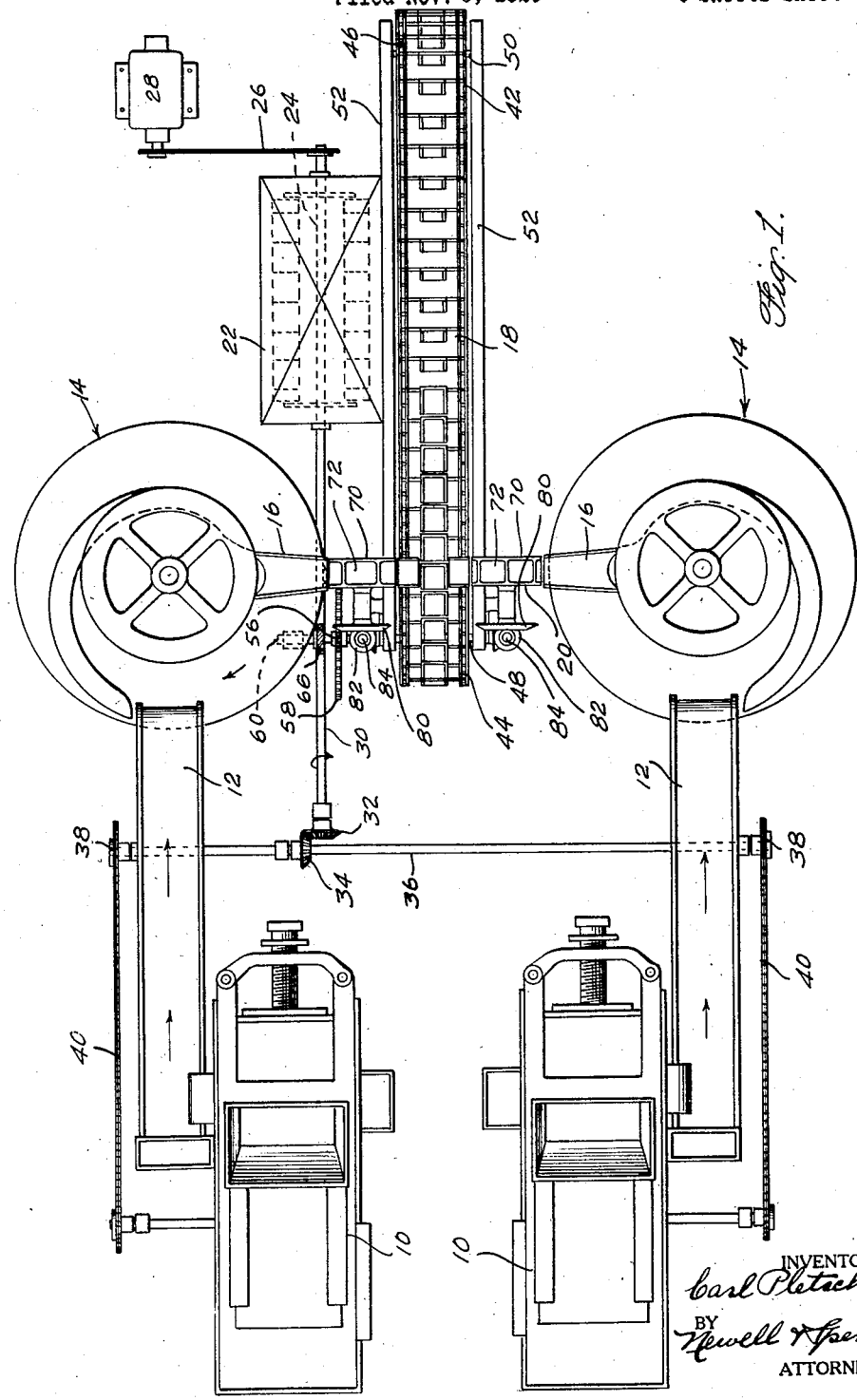

In practicing the invention, the dough is fed in any suitable manner to a plurality of dividing machines 10, of which in the present illustration of the invention there are two. These dividing machines discharge the dough which they have divided into pieces of equal weight upon conveyors 12 which in turn deliver the pieces of dough to a plurality of rounding machines 14, it being understood that there is preferably one rounding machine arranged to receive the dough pieces from each divider through the medium of its respective conveyor 12, and that these particular units may be driven in any desired manner.

The dough pieces, after they have been shaped by the rounders 14 are discharged therefrom by means of a chute or the like 16 with which each rounder is equipped.

After the dough pieces are discharged from the rounders 14 they are transferred to a suitable conveyor, or proofer feeder 18 by means of a suitable timing mechanism 20. From the conveyor 18, the pieces of dough are delivered in the present embodiment of the invention, to a dough proofer 22. The conveyor 18 as illustrated in this application, is of the type disclosed in the patent to R. E.

Baker et al. No. 1,343,184, June 8, 1920, wherein a predetermined number of shaped pieces of dough are automatically discharged simultaneously from the conveyor and delivered to a suitable unit, such for example as a proofer, oven or the like.

In the present embodiment of the invention, the proofer is of the endless conveyor type and includes a plurality of dough carrying pans which are moved circuitously through a proofing chamber, such for example, as disclosed in Patent No. 1,127,000 to G. J. Hicks, dated February 2, 1915.

To provide for continuous automatic operation of the machine, it is important that certain of the units be driven in timed relation to each other to prevent piling up of several pieces of dough at any one point, and at the same time insure the supply of dough pieces to each unit in sufficient quantity to permit of the several units operating at their maximum capacity.

To the above end, the several units which it is desired to operate in timed relation are preferably driven from the main driving shaft 24 of the proofer 22, which shaft is in turn driven by a chain 26 and motor 28 herein shown as of the electric type.

The shaft 24 of the proofer is extended as at 30 and carries a bevel gear 32, which gear 32 meshes with, and drives a similar gear 34 carried by, and serving to drive a shaft 36. This shaft 36, through the medium of sprockets 38 and chains 40 serves to drive the dividing machines 10 which may be of any conventional type.

The conveyor or proofer feeder 18 is preferably of the endless chain type, which endless chains are herein designated by the numeral 42, and pass around sprockets 44 and 46 which in turn are carried upon shafts 48 and 50 respectively and these shafts are mounted in bearings in a suitable supporting framework 52.

To provide for driving the conveyor or proofer feeder 18, preferably the shaft 48 is extended as at 54, and carries rigid with said extension 54, a gear 56. This gear 56 meshes with and is driven by a gear 58, carried by a shaft 60 mounted in the frame 52, and having an extended end 62 supported in a standard 64. The extension 62 of this shaft 60 is carried beyond the shaft 30 and carries a spiral gear 66 meshing with a spiral gear 68 secured to said shaft 30. Thus upon rotation of the shaft 30, the conveyor or proofer feeder 18 will be driven through the medium of the gears 68, 66, shaft 60 and gears 58 and 56.

The timing mechanism hereinbefore mentioned may comprise two wheels 70 each having a plurality of pockets 72 for the reception of pieces of dough, such for example as disclosed in the Patent No. 1,178,674 granted to me April 11, 1916.

It is to be understood that there will be one of these timing wheels receiving the pieces of dough from each of the rounding machines 14, and in that form of the invention illustrated in Figures 1 to 3 inclusive in the drawings, these timing wheels 70 receive the pieces of dough from the respective rounders and deliver them alternately to the conveyor or proofer feeder 18.

The timing wheels 70 are each driven in timed relation to the conveyor or proofer feeder 18 and are arranged relative to each other so as to discharge the pieces of dough alternately into the pockets of the proofer feeder.

Each of these wheels 70 is mounted on a shaft 78 engaging in a bearing 76 on the frame 52. The mechanism for driving each of the timing wheels 70 in the manner above described comprises a bevel gear 80 secured to the shaft 78, an intermeshing bevel gear 82, a shaft 84 mounted in a bearing 86 to which said gear 82 is secured, a bevel gear 88 secured to said shaft 84, and an intermeshing bevel gear 90 secured to the shaft 48 of the proofer feeder.

In the above construction, the timing wheels 70 are driven from the conveyor or proofer feeder 18 and the ratios of the several gears 80, 82 and 88 are such as to drive the timing wheels 70 in proper synchronism with the conveyor or proofer feeder 18. By a proper arrangement of the timing wheels 70 so that the pockets thereon are brought ultimately to discharging position, they will be caused to discharge their pieces of dough alternately into the buckets of the conveyor or proofer feeder 18. The speed of the timing wheels 70 with relation to the movement of the conveyor 18 is such that each timing wheel will discharge the successive pieces of dough contained in the pockets of the wheel into alternate buckets of the conveyor.

In Figures 4 and 5 which illustrate a modified form of the invention, the dough rounding machines 14 and their respective timing mechanisms 20 are offset with respect to each other and instead of delivering the pieces of dough alternately to the conveyor or proofer, the timing wheels 20 are so arranged as to deliver the dough pieces simultaneously thereto.

In the arrangement shown in Figs. 4 and 5, one of the rounders and the corresponding timing wheel is arranged in advance of the other rounder and timing wheel in the direction of feed of the conveyor a distance substantially equal to the width of one of the buckets of the conveyor so that two adjacent buckets of the conveyor will simultaneously register respectively with the timing wheels. In this arrangement, the timing wheels are rotated in timed relation to each other and to the conveyor so that the timing wheels will discharge simultaneously pieces of dough into the two adjacent buckets of the conveyor. In this form of the invention, the arrangement of the several elements of the driving mechanism may be substantially the same as heretofore described in connection with that form of the invention shown in Figures 1 to 3 inclusive.

From the foregoing it will be apparent that by the employment of two dividers and rounders operating in timed relation with a single conveyor, the oven may be adequately supplied to meet its capacity and the output of a baking outfit may be increased without duplication of all of the several units employed. Furthermore it will be seen that should either of the dividers or rounders (which are the two units most liable to break down) become inoperative, the outfit may still continue to operate at a reduced output by throwing out of operation the damaged unit, and working only with one divider and rounder until the necessary repairs can be made.

It is to be understood that the invention is not limited to the particular construction of the illustrated embodiment thereof, but that the invention may be embodied in other forms within the scope of the appended claims.

Having explained the nature and object of the invention, and having specifically described the mechanism embodying the invention in its preferred form, what is claimed is:

1. In a baking outfit, a carrier having spaced receptacles for pieces of dough, a plurality of rounders associated with said carrier and mechanisms respectively associated with each rounder and operated in timed relation to each other and to said carrier for delivering the pieces of dough to the receptacles of said carrier.

2. In a baking outfit, a carrier having separate receptacles for the pieces of dough, a plurality of dough rounders and mechanisms operating in timed relation to each other and to said carrier for delivering the pieces of dough from each of said rounders in succession to the alternate receptacles of said carrier.

3. In a baking outfit, a plurality of dough dividers, a plurality of dough rounders arranged to receive the divided dough from said dividers and shape the same, a travelling proofer, a travelling feeding means for transferring the shaped dough from the dough rounders to the travelling proofer, and means for delivering the shaped dough from the dough rounders to the feeding means, the dividers, the means for delivering the dough from the rounders to the feeding means, said feeding means, and said travelling proofer being driven in timed relation.

4. In a baking outfit, a plurality of dough rounders, a proofer, a feeding means common to said plurality of dough rounders for delivering shaped dough from said dough rounders to the proofer, means for delivering the pieces of dough to said feeding means in timed relation thereto, and means for operating said feeding means in timed relation to the proofer.

Signed at Saginaw, Mich., this 26th day of October, 1925.

CARL PLETSCHER.